United States Patent [19]

Subramanian et al.

[11] 4,065,542
[45] Dec. 27, 1977

[54] TWO STAGE LEACHING OF LIMONITIC ORE AND SEA NODULES

[75] Inventors: Kohur Nagaraja Subramanian, Mississauga; Gerald Vernon Glaum, Oakville, both of Canada

[73] Assignee: The International Nickel Company, Inc., New York, N.Y.

[21] Appl. No.: 687,887

[22] Filed: May 19, 1976

[30] Foreign Application Priority Data

June 10, 1975 Canada ................................. 229007

[51] Int. Cl.$^2$ ...................... C01G 3/10; C01G 51/10; C01G 53/10; C01G 45/10
[52] U.S. Cl. ........................................ 423/35; 423/41; 423/49; 423/140; 423/150; 423/DIG. 4
[58] Field of Search ................... 423/49, 50, 41, 140, 423/150, 34, 35, 43, 633, 558, 554, 493, 147

[56] References Cited

U.S. PATENT DOCUMENTS

| | | | |
|---|---|---|---|
| 2,462,499 | 2/1949 | Hoak | 423/147 |
| 3,549,321 | 12/1970 | Everett | 423/140 |
| 3,795,596 | 3/1974 | Kane et al. | 423/140 X |
| 3,923,615 | 12/1975 | Kane et al. | 423/140 X |

OTHER PUBLICATIONS

Bjorling, G., "Reductive Leaching of Ores, Especially Manganese Ores" in *Progress in Mineral Dressing,* Almquist & Wiksell, Stockholm, 1958, pp. 705–709.

*Primary Examiner*—O. R. Vertiz
*Assistant Examiner*—Brian E. Hearn
*Attorney, Agent, or Firm*—Miriam W. Leff; Ewan C. MacQueen

[57] ABSTRACT

A process which enables cumulative recovery of nonferrous metal values from manganiferous sea nodules and a limonitic ore comprises treating the limonitic ore in an aqueous acidic medium under reducing conditions to extract nonferrous metals and iron from the ore and form a solution containing ferrous iron and then leaching the sea nodules with such solution to extract nonferrous metals from the sea nodules and precipitate a predominant amount of the iron as hydrated ferric oxide.

9 Claims, 1 Drawing Figure

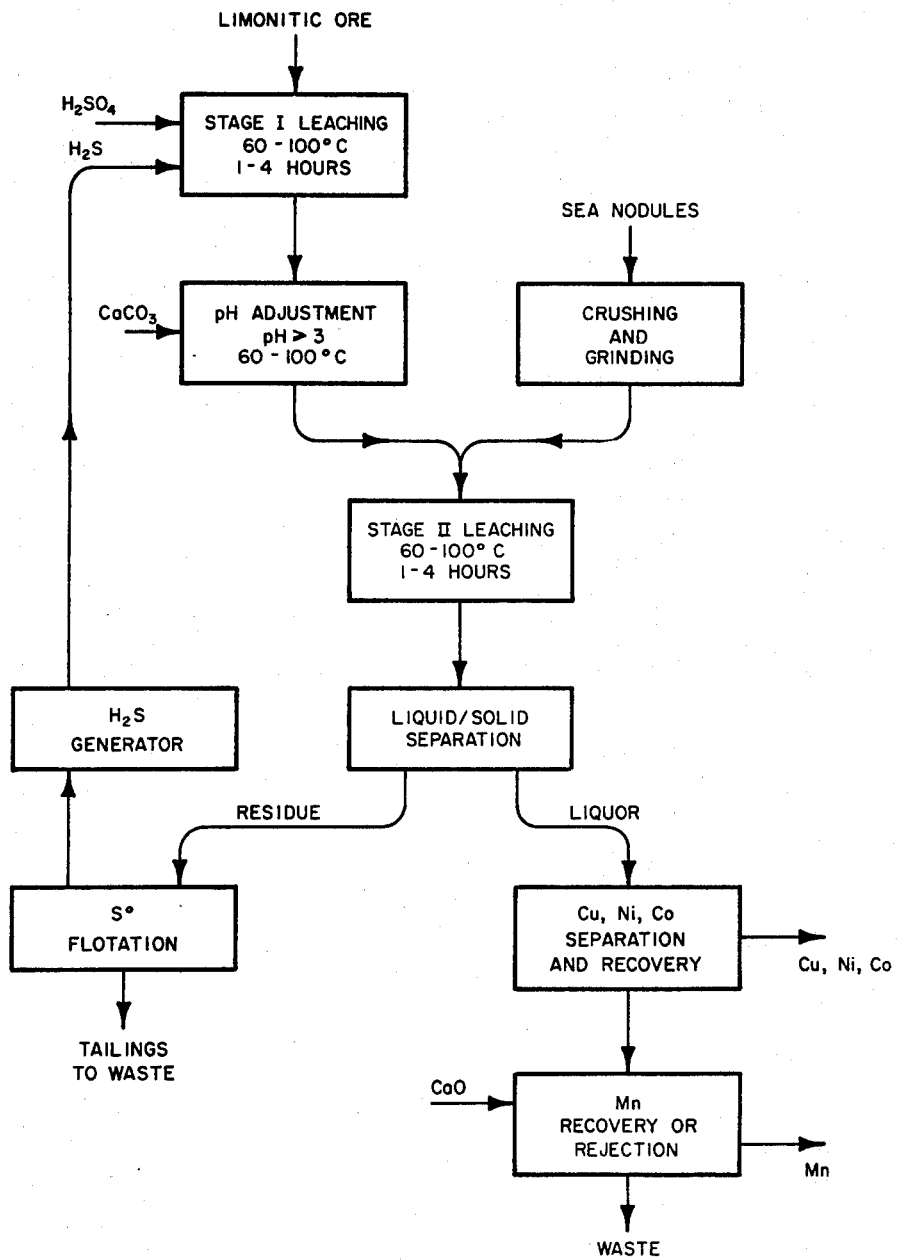

TWO STAGE LEACHING OF LIMONITIC ORE AND SEA NODULES

This invention relates to a hydrometallurgical process for extracting metal values from iron oxide ores, and manganiferous oxide ores, and more particularly to a process which enables cumulative recovery of nonferrous metal values from limonitic ores and deep sea nodules.

The present process involves the extraction of nonferrous metal values from two different source materials, each of which contains nonferrous metals in small quantities and each of which is difficult and/or costly to refine. One of the materials is a manganiferous oxide ore which contains a major amount of manganese and iron, manganese being in the tetravalent state, and a minor amount of the metals nickel, cobalt and/or copper. With respect to the manganiferous oxide ore, the discussion herein will refer principally to the treatment of deep sea nodules. The nonferrous metal values are present in the nodules in a total amount of up to about 5%. The physical and chemical nature of these deposits vary depending on their location. Typical deposits contain, for example, up to about 2% nickel, up to about 2% copper, up to about 1% cobalt, up to about 25% iron and up to about 40% manganese. The nodular deposits are found in large quantities on the ocean floor and they are a potential source of metals. Since the components are tied in an intimate and complex association, they are not amenable to separation by conventional beneficiation procedures.

The other source of the nonferrous metal values is iron oxide ores. Although the process in accordance with the present invention is applicable generally to any oxidic ores in which iron is in a higher oxidation state than divalent iron, it applies more particularly to ferric oxide ore, and it is preferably applicable to ferric oxide ores that contain a major amount of iron in the ferric state and a minor amount of nonferrous metals including at least one of the metals nickel, cobalt, or copper, it will be described herein in conjunction with ferric oxide ores of lateritic origin known as limonitic ores. Typical limonitic ores can contain, for example, from about 40% to about 50% iron, up to about 2% nickel, up to about 0.25% cobalt, and up to about 0.1% copper. Lateritic ores in which the limonitic component provides a total iron content of less than 50% may be employed but will be less economical.

Lateritic deposits are found in large quantities in tropical areas and are a valuable source of metals. Typically, lateritic ores contain two components, a complex high magnesia, high silica fraction commonly known as serpentine, and a high iron fraction known as limonite. Both components may contain nickel and other valuable nonferrous metals. These components of the ore can usually be separated by a simple size classification to recover the limonitic component in, for example, a minus 28 mesh (TSS) fraction. The limonitic portion of the ore essentially consists of a hydrated ferric oxide known as goethite, Fe O(OH). The valuable nonferrous metals contained in the limonite are tied in intimate and complex association with the goethite. Thus, the valuable nonferrous metals are non amenable to separation and concentration by conventional beneficiation procedures. For the same reason, and because the limonite is highly hydrated (often containing more than 50% water), metallurgical extraction of the valuable metals is often economically unattractive.

One aspect of the present invention involves an acidic leach of raw limonitic ore under reducing conditions. Various methods have been proposed for treating limonitic ores by leaching in acidic media. One process currently in use, for example, involves directly leaching the limonitic ore with sulfuric acid at 230°–260° C (400–660 psig steam pressure) to selectively extract nickel and cobalt, leaving the majority of the iron in the residue as hematite. One disadvantage of this process is the high capital cost of leaching vessels to contain the abrasive, corrosive slurry at the leaching conditions. Another disadvantage is the formation of massive scale deposits within the autoclave during leaching, necessitating frequent shut-downs and high labor costs to clean the autoclave.

Another process which has been proposed, U.S. Pat. No. 2,584,700, comprises leaching raw limonitic ore with sulfuric acid and a gaseous mixture of sulfur dioxide and sulfur trioxide. In general, dissolution of limonite to form ferric sulfate solutions requires acid in excess of the stoichiometric requirement. The sulfur dioxide will act as a reducing agent, however, the result is generation of additional acid by the reaction

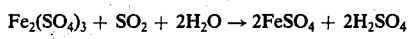

$$Fe_2(SO_4)_3 + SO_2 + 2H_2O \rightarrow 2FeSO_4 + 2H_2SO_4$$

Thus, the final leach solution contains a considerable concentration of free sulfuric acid. This solution is digested with additional ore to consume the free acid, however, even if equilibrium is achieved, the solution must contain some free acid in addition to the ferric iron. The process then proposes to reduce the ferric iron with metallic iron, however, metallic iron will also react with free acid by

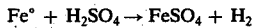

$$Fe° + H_2SO_4 \rightarrow FeSO_4 + H_2$$

resulting in hazardous evolution of hydrogen in addition to excessive consumption of metallic iron. In general, the excessive consumption of sulfuric acid, excessive consumption of metallic iron, and the hazardous evolution of hydrogen gas make this process unattractive.

Another aspect of the present invention involves a reduction acidic leach of sea nodules wherein ferrous ions in solution act as the reducing agent. Several methods have been proposed which involve leaching sea nodules in acidic media.

Among the proposed processes are those such as U.S. Pat. Nos. 3,752,745, and 3,773,635 which involve high temperature chloridizing of the nodules followed by a water leach to extract the metal values. U.S. Pat. No. 3,752,745, for example, uses hydrogen chloride gas at temperatures between 110° C and 600° C before leaching. In addition to the substantial fuel consumption for drying the nodules, formation of metal chloride vapors and particularly chlorine gas are unattractive features of the process. Although directly leaching the nodules with hydrochloric acid solutions would avoid excessive fuel consumption and vaporization of metal chlorides, formation of wet chlorine gas would occur. Since wet chlorine is a highly corrosive gas which must be reduced to regenerate HCl or purified for marketing, chlorination processes which involve the release of chlorine gas are undesirable. Another process involving a high temperature roast is described in U.S. Pat. No.

3,809,624, which requires drying of the nodules preceding a sulfating roast, and then a water leach to extract metal values.

Also among the proposed processes are those which involve reductive leaching in acidic media. For example, U.S. Pat. No. 3,169,856 uses sulfur dioxide to reduce and dissolve the tetravalent manganese in the nodules, simultaneously dissolving the nickel and copper values. Subsequently, the residue is releached to recover cobalt and any remaining nickel and copper values. Another process, U.S. Pat. No. 3,795,596, leaches the nodules with sulfuric acid to dissolve a portion of the copper and nickel, then releaches the residue with ferrous sulfate or ferrous chloride solution to dissolve manganese and the remaining valuable nonferrous metals. In each of the above processes, the resultant leach solutions contain the bulk of the manganese along with at least a portion of the valuable nonferrous metals and possibly iron. Separating and recovering copper, nickel, and cobalt from such solutions will require complex and costly processing. The process of the present invention can more easily justify such solution treatment costs due to the recovery of additional nickel and cobalt values from the limonite.

In accordance with the present invention, the product of a hydrometallurgical leach of the iron oxide ore, which is an acidic leach solution containing ferrous salts, is utilized to treat a manganiferous oxide ore to release nonferrous metals.

Accordingly, where the manganiferous oxide ore is deep sea nodules, the present invention provides a process for extracting metal values from sea nodules and from iron oxide ores, which has relatively low energy requirements and which does not have the problems of chlorine gas evolution associated with hydrochloric acid leaching. Moreover, by utilizing the iron oxide ore as a precursor reagent to assist in the reductive leach of the nodules, metal values can be released from both manganiferous oxide ore and the iron oxide ore. In the embodiment of this invention the ores are respectively sea nodules and limonitic ores, and the present process offers a route for recovering metal values from the deep sea nodules and the limonites, both of which represent substantial future sources of metals.

THE INVENTION

In accordance with the present invention, a multistage process is contemplated for cumulatively extracting nonferrous metal values from a manganiferous oxide ore containing a major amount of manganese and iron, manganese being present in the tetravalent state, and at least one nonferrous metal selected from the group nickel, copper and cobalt and from an iron oxide ore containing a major amount of iron and a minor amount of nonferrous metal, iron in the iron oxide ore being present in a higher oxidation state than the divalent state, comprising:

a. reductively leaching said iron oxide ore in an acidic medium in the presence of a reducing agent to form a first leach product comprising a first leach solution containing ferrous iron and nonferrous metal values;

b. adjusting the pH of the first leach solution to at least about 3, c. selectively leaching the manganiferous oxide ore in the pH first leach solution to reduce tetravalent manganese to the divalent state and to selectively extract nonferrous metal values in solution while precipitating iron as hydrated ferric oxide, thereby forming a second leach solution containing nonferrous metal values derived from the iron oxide ore and the manganiferous oxide ore; and d. separating the second leach solution from the remaining residue.

It is generally believed that in the complex manganiferous oxide ores such as sea nodules, manganese is present mainly as $MnO_2$ and it is necessary to reduce the $Mn^{+4}$ to $Mn^{+2}$ to release the manganese and other nonferrous metals. The ferrous iron derived from the reductive acidic leach of the iron oxide ore, e.g. limonite, acts as a reducing agent to convert tetravalent manganese to the soluble divalent state, and the ferrous iron is oxidized and precipitated mostly as hydrated ferric oxide. Nonferrous metals are leached from the iron oxide ore under the acidic reducing conditions for extracting iron as ferrous iron from the ore.

In co-pending U.S. application Ser. No. 687,910 a method is disclosed for extracting iron values as ferrous salts from limonitic ores by a hydrometallurgical reductive acidic leach which is carried out at relatively mild conditions of temperature and pressure. Although the present process is not limited to this method of extracting metal values from the limonitic ores, it can be utilized to advantage in the present process. According to the proposed process, leaching of the iron oxide ore is effected in an acidic medium under reducing conditions to form a solution containing ferrous iron. The reaction may be carried out under relatively mild conditions, e.g. up to about 100° C and advantageously at about 50° to 100 ° C, and under essentially atmospheric pressures, although higher pressures, e.g. up to about 20 psig can be used. Preferably, the pH is no greater than about 2.0 since nickel and cobalt may be precipitated as sulfides when sulfide reductants are employed. More preferably th pH ranges up to about 1.5.

Leaching of the raw manganiferous oxide ores may be effected at roughly the same conditions of temperature and pressure as the iron oxide ore. However, the pH must be initially adjusted to a value between about 3 to about 4, preferably at about 3. Below an initial pH of about 3 the iron, which is oxidized by the tetravalent manganese and precipitated, forms a gelatinous slurry which hinders leaching and subsequent solids liquid separation. If the pH is adjusted to pH 3 or above before adding the nodules, no gelatinous precipitates are formed even though the pH may decrease to about 1.5 during the leach.

It will be appreciated that the reactions occurring in each step are quite complex. However, in a preferred multistage embodiment of this invention in which limonite is the iron oxide ore, sulfuric acid is the acid medium, hydrogen sulfide the reducing agent and sea nodules the manganiferous ore, the preferred reactions with respect to the iron are believed to be as follows:

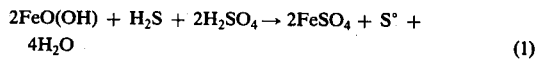
(1)

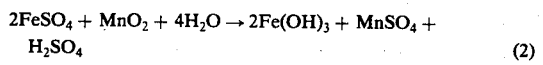
(2)

The free acid produced by reaction (2) is available to release nonferrous metals present in the nodules.

It will be noted that by combining the processing of the iron oxide ore, e.g. limonite, and the manganiferous oxide ore, e.g. sea nodules, the value of the product is substantially increased but the costs are not. For example, in the embodiment in which limonite and sea nodules are treated, advantage is taken of the reduced state of the limonitic ore to treat the nodules and the consumption of acid is not significantly higher than that needed for treating the nodules alone.

Recovery of metal values from the leach solution can be effected by known techniques such as solvent extraction, ion exchange, hydrolysis, sulfide or carbonate precipitation.

THE DRAWING

The accompanying figure is a schematic flow sheet showing the process for treating raw sea nodules and a limonitic ore according to a preferred embodiment of this invention.

DESCRIPTION OF PREFERRED EMBODIMENTS

As indicated above, preferred materials treated for extraction of nonferrous metals according to the present invention are raw sea nodules and limonitic ores, both of which represent substantial ore reserves.

LEACHING OF LIMONITE — STAGE I

A preferred method of treating the limonitic ore is described, as indicated above, in the aforementioned copending Canadian application. Briefly, this step comprises leaching the limonitic ore in an acidic medium under reducing conditions to form a solution containing ferrous iron. Nonferrous metal values in the ore are released into the solution.

The acid may be any acid which is non-oxidizing in the medium. Preferred acids are hydrochloric and sulfuric. Sufficient acid is used to provide a final pH of less than about 2, preferably the final pH is about 1.5.

The amount of acid used, based on the weight of limonite, is about 60% to about 90% hydrochloric, preferably about 70% to about 80% hydrochloric acid; or about 80% to about 120% sulfuric acid, preferably about 90% to about 110% sulfuric acid.

Generally, the reducing agent is provided in an amount sufficient to reduce substantially all the iron in the iron oxide ore to the divalent state in solution. Advantageously, the reducing agent is a sulfide and preferably the $S^=$ is converted to $S°$. The sulfide is provided to the leaching medium in a readily available state. Examples of suitable sulfides are $H_2S$, FeS, ammonium sulfide, alkali metal sulfides and alkaline earth metal sulfides, etc. Hydrogen sulfide is preferred. The hydrogen sulfide is generally bubbled through the leaching medium. The total amount of $H_2S$ consumed is about 10% to about 15%, based on the weight of the iron oxide ore, e.g., limonite.

The limonitic ore may be leached at temperatures from about 25° C to about 110° C, 50° C to 100° C being preferred for the reason of improved reaction rates. Advantageously, this step is carried out at atmospheric pressure, although pressures, e.g., up to about 20 psig may be used. The reaction is permitted to continue until a sufficient amount of ferrous iron is produced. Advantageously, substantially all of the iron is available in the ferrous state. Reaction time will depend on temperature, acid concentration, and the $H_2S$ partial pressure. Generally, at about 60° C to 100° C, the reaction time will be about 1 to 6 hours.

In a preferred embodiment of this invention, limonite is leached in a sulfuric acid medium at a pH of up to about 1.5 in the presence of hydrogen sulfide at 60° to 100° C, and atmospheric pressure.

Before proceeding to the leach of the sea nodules, the limonite leach solution is adjusted to a pH greater than 3 in order to prevent formation of gelatinous precipitates. The pH adjustment is effected by the addition of a neutralizing agent such as calcium carbonate, calcium oxide, sodium carbonate or sodium hydroxide; calcium carbonate is a preferred pH adjustment agent for the reason that it is more economical and the resultant calcium sulfate is only slightly soluble in pregnant liquor. The remaining calcium sulfate is precipitated into the leach residue, providing an ecologically acceptable method of disposing sulfuric acid.

In STAGE II of the present invention, the product of the reductive leach, which comprises a pregnant leach solution containing ferrous iron is utilized to extract metal values from sea nodules.

LEACHING OF SEA NODULES — STAGE II

Briefly, this step comprises subjecting the raw sea nodules to direct leaching under relatively mild conditions in the product solution or slurry resulting from leaching the iron oxide ore, e.g. limonite. The leaching solution derived from the treatment of the iron oxide ore may be separated from the residue. However, it is preferred to utilize the product directly, i.e. without separating the leach solution from the residue.

Although the particle size is not a critical requirement of this process, prior to leaching it is advantageous to reduce the size of the materials to be treated, e.g. to 95% $\leq$ 48 mesh, and preferably 95% $\leq$ 100 mesh. Although the nodules are porous and have a relatively large surface area, the great tortuosity of the pores in the nodules hinders diffusion of reactants and products. Therefore, it is advantageous to reduce the size of the nodules, thereby making the nodules receptive to complete and rapid reactions.

To determine the amount of manganiferous sea nodules to add to the leaching solution, the manganese content of the nodules and the iron content of the limonitic ore must be determined. Preferably, the nodules are added to the resultant product of the first stage so that the second stage will contain about 95 to 100% of the manganese in the nodules stoichiometric to iron in the limonitic ore.

Following pH adjustment to greater than about 3, the nodules are leached in the leaching medium derived from treatment of the iron oxide ore at a temperature of about 25° to about 110° C, preferably about 60° to about 100° C. Advantageously, leaching is effected at atmospheric pressure, although pressures up to about 20 psig may be used. Acid formed by the reaction of ferrous sulfate with tetravalent manganese in the nodules is consumed in the dissolution of nonferrous metals, e.g. nickel, cobalt, copper and gangue constituents such as magnesium and aluminum. However, as the leaching of the nodules proceeds, the medium tends to become more acidic.

Referring to the embodiment illustrated in the schematic flow diagram of the accompanying figure, nonferrous metal values are recovered from limonite and manganiferous sea nodules. For example, a slurry of limonite is formed containing 10% solids and 100% sulfuric acid, by weight, based on the weight of the limonite ore; about one ton of acid per ton of feed (limonite ore) being used. For limonite ore containing about 45% iron, a total of about 15% $H_2S$, by weight, is fed to the slurry at about 2 psig. The reaction takes place readily at about 80° C. The resultant slurry contains elemental sulfur and silicate gangue. Iron is extracted into the leaching medium as ferrous sulfate, and also, nonferrous metals. e.g. nickel and/or cobalt are extracted into the solution.

The product resulting from the leaching of the limonitic ore is adjusted to a pH of about 3 with limestone, and sea nodules ground to about minus 100 mesh (TSS) are added to the partially neutralized medium. Without separating the residue, nodules are added to the leaching solution in an amount to provide about 95% of manganese stoichiometric to iron in the limonitic ore. Reaction proceeds readily at about 80° C.

In the reaction of the ferrous sulfate with the tetravalent manganese in the aqueous slurry, sulfuric acid is formed which is then available to react with the nonferrous metals such as copper, nickel, cobalt and gangue constituents such as magnesium and aluminum. The bulk of the iron precipitates from solution.

The residual solids obtained consist mainly of hydrated ferric oxide, gypsum, gangue, and elemental sulfur. The solution contains mainly nonferrous metal values. The residual solids are separated from the pregnant leach solution, e.g., by filtration. The elemental sulfur may be recovered, used to regenerate hydrogen sulfide and recycled to treat the limonitic ore in the reductive leaching step.

The solution, which contains nonferrous metal values, is treated for separation of manganese values, and then for recovery of the metals according to known techniques. For example, one method of treating the pregnant leach solution to recover nickel, copper, cobalt and manganese is as follows: Remove copper from solution by solvent extraction, e.g. with LIX 64N (a commercial product manufactured by General Mills of Minneapolis, Minn.). Copper can then be stripped from the solvent with spent electrolyte and recovered by electrolysis. Nickel, cobalt and any remaining copper are precipitated as sulfides from the solution at 90° C with 30 psig $H_2S$. Nickel and cobalt can be recovered from this precipitate by several well-known techniques. For example, the precipitate, after separation from solution by filtration, may be redissolved and the cobalt separated from the nickel by solvent extraction with e.g., D2EHPA (diethylhexyl phosphoric acid). Both nickel and cobalt can then be recovered by electrolysis. The leach solution containing manganese can then be, for example, evaporated and cooled to crystallize manganese salts such as manganous chloride or manganous sulfate. Manganese oxides can be recovered from these manganese salts by roasting, e.g. at 600° C to 1000° C. The respective acids, hydrochloric or sulfuric, can be regenerated and recovered from the gaseous products of this decomposition and recycled to the leaching stage.

The following illustrative examples are given for the purpose of enabling those skilled in the art to have a better understanding of the invention.

EXAMPLE 1

Samples of a limonitic ore, screened to pass 28 mesh (TSS), containing 1.22% Ni, 0.15% Co, and 46.1% Fe are added to a leaching vessel containing a $H_2SO_4$ solution. The solution contains 110% $H_2SO_4$ by weight of limonitic ore, which is equivalent to about 105% of the stoichiometric requirement to dissolve the soluble metals in the ore. After raising the slurry to the leaching temperature, $H_2S$ is metered continuously into the leach slurry and the reaction is permitted to proceed for 4 hours. After filtering and washing, the leach residue and leach solution are analyzed for Ni, Co, and Fe values. The total $H_2S$ consumption is calculated from the elemental sulfur content of the leach residue. The data tabulated in Table I show the rate of dissolution as a function of slurry pulp density and leaching temperature.

The results in Table I show that the rate of dissolution of the ore is dependent on the pulp density and on the temperature. Comparison of test A with tests B and C shows that a marked increase in the rate of dissolution was obtained by increasing the pulp density from 10 to 20% solids, and/or by increasing the temperature from 60° to 80° C. Test D shows the leaching at 20% solids and 80° C achieved the most complete dissolution of the ore.

EXAMPLE 2

Samples of Pacific Ocean sea nodules containing 0.84% Cu, 1.17% Ni, 0.20% Co, 6.46% Fe, and 22.8% Mn are ground to pass 100 mesh (TSS) and leached for 1 to 2 hours at 90° C in sufficient $FeSO_4$ solution (80 grams per liter $Fe^{+2}$) to provide stoichiometric iron for manganese in the nodules. The effect of the initial pH of the ferrous sulfate solution on the reaction was studied. The results of these tests are shown in Table II.

TABLE I

| Test | Pulp Density (% solids) | Temp (° C) | Time (hr) | pH | Redox* (Pt/SCE) (mv) | $H_2S$ Consumption (weight %) | Residue Analysis (%) | | | | Extraction (%) | | |
|---|---|---|---|---|---|---|---|---|---|---|---|---|---|
| | | | | | | | Weight | Ni | Fe | S° | Ni | Co | Fe |
| A | 10 | 60 | 1 | 0.1 | +230 | — | 83 | 1.16 | 44.0 | — | 24 | — | 23 |
| | | | 2 | 0.4 | +240 | — | 64 | 0.99 | 38.2 | — | 50 | — | 49 |
| | | | 3 | 0.7 | +190 | — | 44 | 0.73 | 30.7 | — | 75 | — | 72 |
| | | | 4 | 1.0 | +130 | 11.2 | 31 | 0.42 | 21.8 | 34.0 | 90 | 99 | 86 |
| B | 20 | 60 | 1 | — | +420 | — | 66 | 1.09 | 41.9 | — | 43 | — | 42 |
| | | | 2 | 0.2 | +340 | — | 41 | 0.76 | 31.7 | — | 75 | — | 73 |
| | | | 3 | 0.6 | +250 | — | 26 | 0.37 | 20.4 | — | 92 | — | 39 |
| | | | 4 | 0.9 | +190 | 13.3 | 26 | 0.18 | 12.5 | 48.1 | 96 | 99 | 93 |
| C | 10 | 80 | 1 | 0.6 | +370 | — | 52 | 0.97 | 37.6 | — | 59 | — | 58 |
| | | | 2 | 1.5 | +120 | — | 24 | 0.23 | 15.3 | — | 96 | — | 92 |
| | | | 3 | 1.8 | +50 | — | 22 | 0.06 | 7.35 | — | 99 | — | 97 |
| | | | 4 | 1.8 | +40 | 13.7 | 22 | 0.05 | 6.25 | 58.5 | 99 | 92 | 97 |
| D | 20 | 80 | 1 | 0.2 | +520 | — | 44 | 0.97 | 40.4 | — | 65 | — | 61 |
| | | | 2 | 0.4 | +450 | — | 35 | 0.68 | 82.1 | — | 81 | — | 76 |
| | | | 3 | 0.6 | +320 | — | 23 | 0.12 | 11.1 | — | 98 | — | 95 |
| | | | 4 | 1.2 | +220 | 13.8 | 23 | 0.03 | 4.92 | 56.3 | 99 | 89 | 98 |

*Redox potential in millivolts based on Platinum vs. a Standard calomel electrode
"—" means data not obtained.

TABLE II

| Test # | pH Initial | pH Final | Residue Analysis % Weight* | Cu | Ni | Distribution in Solution % Cu | Ni | Co | Fe | Mn |
|---|---|---|---|---|---|---|---|---|---|---|
| E | 1.5 | 1.7 | 190 | 0.20 | 0.11 | 58 | 83 | 85 | 0.5 | 80 |
| F | 3.0 | 2.1 | 130 | 0.19 | 0.06 | 74 | 94 | 86 | 15 | 89 |

*By weight of nodules

Comparison of tests E and F in Table II shows that extraction of Cu and Ni is improved if the ferrous sulfate solution is initially at pH 3.0 rather than 1.5. When leaching in the ferrous sulfate solution initially at pH 1.5, the slurry becomes very viscous requiring excessive agitation. This problem does not occur when the ferrous sulfate solution is initially at pH 3.0. The weight of the leach residues further exemplified the advantages of neutralizing the ferrous sulfate solution, obtained by leaching limonitic ore, before leaching the sea nodules.

EXAMPLE 3

Three experiments are carried out to determine the effect of leaching temperature and the amount of acid added on the two stage leaching process.

First stage leaches are carried out on samples of limonitic ore, screened to pass 28 mesh (TSS), containing 0.014% Cu, 1.23% Ni, 0.13% Co, 46.9% Fe, and 0.85% Mn. The samples are slurried in a sulfuric acid solution, heated to 90° C, and reductively leached by metering $H_2S$ into the slurry for 2 hours. After the first stage leach, the slurry is neutralized to pH 3.0 by the addition of a measured amount of $CaCO_3$.

The second stage leaches are carried out with Pacific Ocean sea nodules, ground to pass 100 mesh (TSS), containing 0.84% Cu, 1.17% Ni, 0.20% Co, 6.46% Fe, and 22.8% Mn. Sea nodules, in the amount of 95% by weight of limonite, are added to the neutralized first stage leach slurry, and the leaching continued for an additional 1 hour at 90° C.

The results in Table III show that the lowest $CaCO_3$ requirement and highest extractions are obtained when the first stage leach is carried out at 10% solids with 100% $H_2SO_4$ by weight of limonite. Comparison of tests G and H shows that

TABLE III

| Test # | Pulp Density (1) (% solids) | $H_2SO_4$ Added (2) (Weight %) | $CaCO_3$ Added (2) (Weight %) | Residue Analyses (%) Weight (3) | Cu | Ni | Extraction (4) (%) Cu | Ni | Co | Fe | Mn |
|---|---|---|---|---|---|---|---|---|---|---|---|
| G | 10 | 100 | 7.6 | 91 | 0.14 | 0.07 | 71 | 95 | 91 | 4.5 | 88 |
| H | 15 | 100 | 12.2 | 100 | 0.26 | 0.12 | 37 | 89 | 79 | 11 | 81 |
| I | 15 | 110 | 23.5 | 107 | 0.26 | 0.13 | 30 | 88 | 80 | 19 | 76 |

(1) Pulp density of first stage leach slurry
(2) Based on the weight of limonite
(3) Based on the total weight of limonite and sea nodules
(4) Based on the total values in limonite and sea nodules increasing the pulp density hinders the first stage leach, increasing the $CaCO_3$ consumption. Since less ferrous sulfate is formed, second stage extraction is correspondingly lower. Comparison of tests H and I shows that increased acid additions cause a proportionate increase in $CaCO_3$ consumption without increasing the extractions.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A multistage process for cumulatively extracting metal values from sea nodules containing a major amount of manganese and iron, manganese being present in tetravalent form, and containing a lesser amount of at least one of the nonferrous metals nickel, cobalt and copper, and from an iron oxide ore containing a major amount of iron and a minor amount of at least one of the nonferrous metals selected from the group nickel, cobalt and copper, iron being present in an oxidation stage higher than the divalent state, comprising:
   a. reductively leaching said iron oxide ore in an acidic medium in the presence of a non-oxidizing acid and a reducing agent at a temperature in the range of about 25° C to about 110° C, said acid being provided in sufficient amount to give a final pH for leaching said iron oxide ore of less than about 2 and said reducing agent being selected from the group $H_2S$, FeS, ammonium sulfide, alkali metal sulfides and alkaline earth metal sulfides, to form a product comprising a first leach solution containing divalent iron and said nonferrous metal values;
   b. adjusting the pH of the first leach solution to at least about 3;
   c. selectively leaching the sea nodules in the pH-adjusted first leach solution at a temperature in the range of about 25° C to about 110° C to reduce tetravalent manganese to the divalent state and to selectively extract nonferrous metal values from the manganiferous ore into solution while precipitating iron as hydrated ferric oxide, thereby forming a second leach solution containing nonferrous metal values derived from the iron oxide ore and the sea nodules ore; and
   d. separating the second leach solution from the remaining residue.

2. A process according to claim 1, wherein the reductive leach of the limonitic ore ore is carried out at a temperature between about 50° C to about 100° C at substantially atmospheric pressure and at a pH of up to about 1.5, and the selective leach of the sea nodules is carried out at a temperature between about 60° C to about 100° C, at atmospheric pressure and at an initial pH of about 3 to about 4.

3. A process according to claim 1, wherein the reducing agent for the reductive leach of the limonitic ore is hydrogen sulfide.

4. A process according to claim 1, wherein the acidic medium for the reductive leach is sulfuric acid.

5. A process according to claim 1, wherein the iron oxide ore comprises a nickeliferous limonite.

6. A multistage process for cumulatively extracting metal values from a limonitic ore and manganiferous sea nodules, said sea nodules containing a major amount of manganese and iron, manganese being predominantly in the tetravalent state, and a minor amount of nonferrous metals including at least one of the metals nickel, cobalt and copper, and said limonitic ore containing a minor amount of at least one of the nonferrous metals selected from the group nickel, cobalt and copper comprising:

a. subjecting a slurry of the limonitic ore to a reductive leach in an acidic medium in the presence of a non-oxidizing acid and a reducing agent at a temperature of about 60° C to about 100° C, said acid being present in sufficient amount to give a final pH in the leach solution of up to about 1.5 said reducing agent being selected from the groups $H_2S$, FeS, ammonium sulfide, alkali metal sulfides, and alkaline earth metal sulfides, to form a product comprising a first leach solution containing divalent iron and nonferrous metal values;

b. adjusting the pH of the product of the limonitic ore leach to a value of between about 3 to about 4;

c. forming a slurry of the manganiferous sea nodules in the pH-adjusted product at a temperature of about 50° C to about 100° C, to reduce tetravalent manganese to the divalent state and to selectively leach nonferrous metals from the nodules while precipitating iron as hydrated ferric oxide, thereby forming a second leach solution containing nonferrous metal values derived from the limonitic ore and the sea nodules; and d. separating the second leach solution from the remaining residue.

7. A process according to claim 6 wherein the acidic medium of the limonitic ore reductive leach comprises sulfuric acid.

8. A process according to claim 6 wherein the reducing agent of the limonitic ore acidic leach is hydrogen sulfide.

9. A process according to claim 6 wherein the pH adjustment is effected with calcium carbonate.

* * * * *